United States Patent
Sasaki et al.

(10) Patent No.: US 6,964,373 B2
(45) Date of Patent: Nov. 15, 2005

(54) RECORDING MEDIUM AND CODED IMAGE READER APPARATUS

(75) Inventors: Hiroshi Sasaki, Hachioji (JP); Masayoshi Tanimura, Nakakoma-gun (JP); Hirokazu Tanaka, Kyoto (JP)

(73) Assignees: Olympus Optical Co., Ltd., Tokyo (JP); HAL Laboratory, Inc., Tokyo (JP); Creatures Inc., Tokyo (JP); Nintendo Co., Ltd., Kyoto (JP)

(*) Notice: Subject to any disclaimer, the term of this patent is extended or adjusted under 35 U.S.C. 154(b) by 82 days.

(21) Appl. No.: 10/086,426

(22) Filed: Mar. 1, 2002

(65) Prior Publication Data

US 2002/0125319 A1 Sep. 12, 2002

(30) Foreign Application Priority Data

Mar. 6, 2001 (JP) .......................... 2001-062394

(51) Int. Cl.[7] ................................ G06K 7/00
(52) U.S. Cl. ........................ 235/435; 235/454
(58) Field of Search .................... 235/435, 436, 235/454, 487, 494

(56) References Cited

U.S. PATENT DOCUMENTS

| 5,058,089 | A | | 10/1991 | Yoshimaru et al. |
| 5,644,557 | A | | 7/1997 | Akamine et al. |
| 5,734,752 | A | * | 3/1998 | Knox .......................... 358/3.28 |
| 5,896,403 | A | | 4/1999 | Nagasaki et al. |
| 6,148,121 | A | | 11/2000 | Fujimori et al. |
| 6,330,976 | B1 | * | 12/2001 | Dymetman et al. .......... 235/487 |
| 6,570,104 | B1 | * | 5/2003 | Ericson et al. ............. 178/18.09 |

FOREIGN PATENT DOCUMENTS

| EP | 0 887 765 A2 | 12/1998 |
| JP | 6-231466 A | 8/1994 |
| JP | 8-044811 A | 2/1996 |

* cited by examiner

*Primary Examiner*—Michael G. Lee
*Assistant Examiner*—Jamara A. Franklin
(74) *Attorney, Agent, or Firm*—Frishauf, Holtz, Goodman & Chick, P.C.

(57) ABSTRACT

A coded image on a recording medium (a card) which records desired information as an optically readable coded image (a dot code) contains predetermined record location information indicating a record location at which the image is recorded on the card, as, for example, an element of a physical format of the image. A coded image reading apparatus for reading the coded image from the card has image inputting means (a pickup). The apparatus includes a CPU, which includes and can execute record location determining means (a program) for obtaining record location information from an input image and determining a record location of the image. The card is guided so that the proper read operation can be performed in accordance with this function of determination.

8 Claims, 13 Drawing Sheets

| Block ID | Record location | Message 1 | Message 2 | Message 3 | Message 4 |
|---|---|---|---|---|---|
| 1~n | ① | Code along lower short side is read | Code is read incompletely. Read code along upper short side. | Too great deterioration occurs in codes along both short sides. Replace card with new one. | Deterioration in code along lower short side cannot be corrected. Read code along upper short side. |
| n+1~n+m | ② | Code along left long side is read | Code is read incompletely. Read code along right long side. | Too great deterioration occurs in codes along both long sides. Replace card with new one. | Deterioration in code along left long side cannot be corrected. Read code along right long side. |
| n+m+1~n+m+p | ③ | Code along upper short side is read | Code is read incompletely. Read code along lower short side. | Too great deterioration occurs in codes along both short sides. Replace card with new one. | Deterioration in code along upper short side cannot be corrected. Read code along lower short side. |
| n+m+p+1~n+m+p+q | ④ | Code along right long side is read | Code is read incompletely. Read code along left long side. | Too great deterioration occurs in codes along both long sides. Replace card with new one. | Deterioration in code along right long side cannot be corrected. Read code along left long side. |

FIG. 5

| Record location | Message 10-1 | Message 10-2 | Message 10-3 |
|---|---|---|---|
| ① | Code along lower short side is read | Keep reading code along left long side of same card | Read code Y on card X |
| ② | Code along left long side is read | Keep reading code along lower short side of same card | Read code Y on card X |
| ③ | Code along upper short side is read | Keep reading code along right long side of same card | Read code Y on card X |
| ④ | Code along right long side is read | Keep reading code along upper short side of same card | Read code Y on card X |

FIG. 8

| Block ID | Record location | Data type | Record format |
|---|---|---|---|
| 1~n | ① | Control data/program | Type 1 |
| n+1~n+m | ② | Material data (image) | Type 2 |
| n+m+1~n+m+p | ③ | Control data/program | Type 1 |
| n+m+p+1~n+m+p+q | ④ | Material data (sound) | Type 2 |

FIG. 11

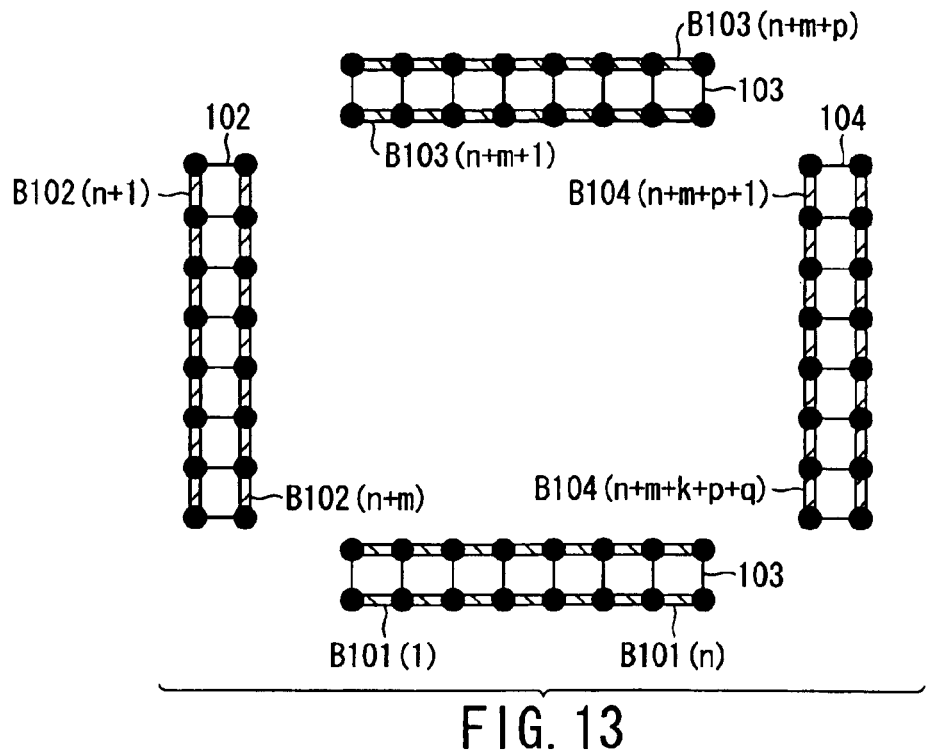
FIG. 13
Physical format
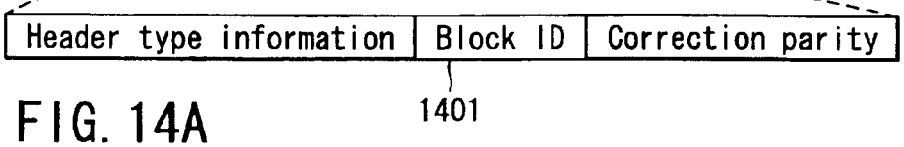
FIG. 14A
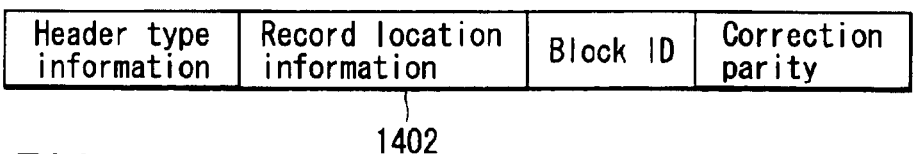
FIG. 14B

RECORDING MEDIUM AND CODED IMAGE READER APPARATUS

CROSS-REFERENCE TO RELATED APPLICATIONS

This application is based upon and claims the benefit of priority from the prior Japanese Patent Application No. 2001-62394, filed Mar. 6, 2001, the entire contents of which are incorporated herein by reference.

BACKGROUND OF THE INVENTION

1. Field of the Invention

The invention relates to a recording medium which records various types of information such as sound, images or text as an optically readable coded image, and a coded image reading apparatus which optically reads the coded image from the recording medium.

2. Description of the Related Art

Heretofore, the technique of recording various types of information such as sound, images, or text that can be handled by a computer as an optically readable coded image typified by a one-dimensional or two-dimensional barcode or the like on a recording medium such as paper has been already known in, for example, Jpn. Pat. Appln. KOKAI Publication No. 6-231466 and so forth.

The recording medium disclosed in the publication makes it possible to provide a user with a wider variety of information by a synergistic effect of information which functions as a readable image which a human being can visually, directly read (or understand), such as a general character, symbol, figure or pattern or a photographic image recorded on the medium, and various types of information contained in a dot code which functions as a coded image into which the readable image is coded, and therefore the recording medium is expected to be used in various fields such as toy applications and educational applications toward the future information age.

However, this type of coded image including the dot code disclosed in the above-mentioned Jpn. Pat. Appln. KOKAI Publication No. 6-231466 does not contain information indicative of a record location at which the coded image is recorded on the recording medium, and therefore it is impossible to devise various schemes for reading the coded image in accordance with the record location of the coded image.

When such a coded image is provided for a user in a form in which the coded image is formed on a recording medium such as a card or paper for the user's convenience, easy-to-follow as well as proper instructions are required for practical use because of an increasing tendency that the proper way to use the recording medium, more specifically, how to output and reproduce information from the recording medium, etc., becomes complicated according to the type of arrangement of the recording medium and the combination of functions thereof.

The invention is designed to overcome the foregoing problems. It is an object of the invention to provide a recording medium which makes it possible to devise various schemes for the reading of an optically readable coded image in accordance with a record location at which the coded image is recorded on the recording medium, and which enables a user to make simple and proper use of the recording medium, and a coded image reading apparatus for reading the coded image from the recording medium.

BRIEF SUMMARY OF THE INVENTION

The invention is provided in order to solve the foregoing problems and achieve the object.

According to an aspect of the invention, there is provided a recording medium which records information as an optically readable coded image, wherein the coded image contains record location information indicative of a record location at which the coded image is recorded on the recording medium. Therefore, this makes it possible to devise various schemes for the reading of the coded image in accordance with the record location information.

According to another aspect of the invention, there is provided a coded image reading apparatus for optically reading a coded image from the recording medium, which includes: image inputting means for inputting the coded image; and record location determining means for obtaining the record location information from the coded image inputted by the image inputting means, and determining the record location at which the input coded image is recorded on the recording medium.

In the coded image reading apparatus, the coded image contains record location information indicative of a record location at which the coded image is recorded on the recording medium, and the coded image reading apparatus can determine the record location of the coded image in accordance with the record location information. Therefore, the use of the record location information permits devising various schemes for the reading of the coded image.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiment of the invention, and together with the general description given above and the detailed description of the embodiment given below, serve to explain the principles of the invention.

FIG. 2A is a plan view of a card having a rectangular shape and having coded images near two sides of the card;

FIG. 2B is a plan view of a card having the same rectangular shape and having coded images near four sides of the card;

FIG. 5 shows a record location table and a message dictionary table of the first embodiment in combination in tabular form;

FIG. 8 shows a record location table and a message dictionary table of the second embodiment in combination in tabular form;

FIG. 11 shows the record locations, the types of data and the record formats of the third embodiment in combination in tabular form;

FIG. 13 is a schematic representation illustrating a layout of the coded images on the card shown in FIG. 2B;

FIGS. 14A and 14B illustrate the contents of a block header in the coded image;

FIG. 16A is an enlarged view of a block which is a unit of the dot code;

FIG. 16B illustrates an example of the dot code comprising blocks coupled in a one-dimensional array;

FIG. 17A is a perspective view of an external appearance of the coded image reading apparatus; and FIG. 17B is an illustration of a configuration of a pickup within the coded image reading apparatus.

DETAILED DESCRIPTION OF THE INVENTION

The invention will be described in detail below by referring to a plurality of specific embodiments.

Prior to the detailed description, the general description is firstly given with reference to FIGS. 16A to 17B with regard to the respective specific configurations of a coded image for suitable use in the invention and a coded image reading apparatus for optically reading the coded image.

Examples of the coded image for suitable use in a recording medium of the invention and the reading apparatus for reading the coded image are a dot code which the applicant has already proposed as the coded image in Jpn. Pat. Appln. KOKAI Publication No. 6-231466, and a reading apparatus for reading the code disclosed therein.

Incidentally, the coded image is called "a dot code" or simply "a code".

Figure 16A:
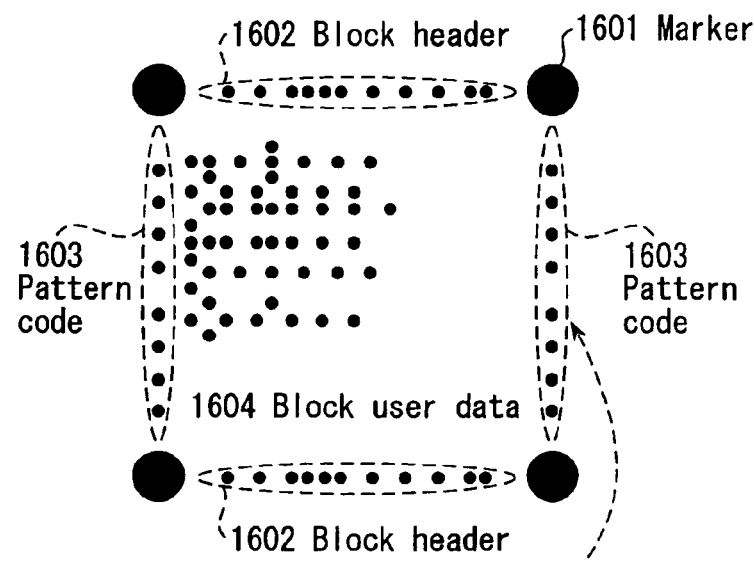
FIGS. 16A and 16B show an example of the dot code recorded on the recording medium of the invention.
Figure 16B:
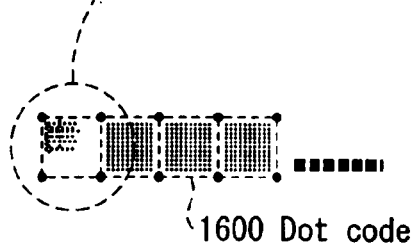
Figure 17A:
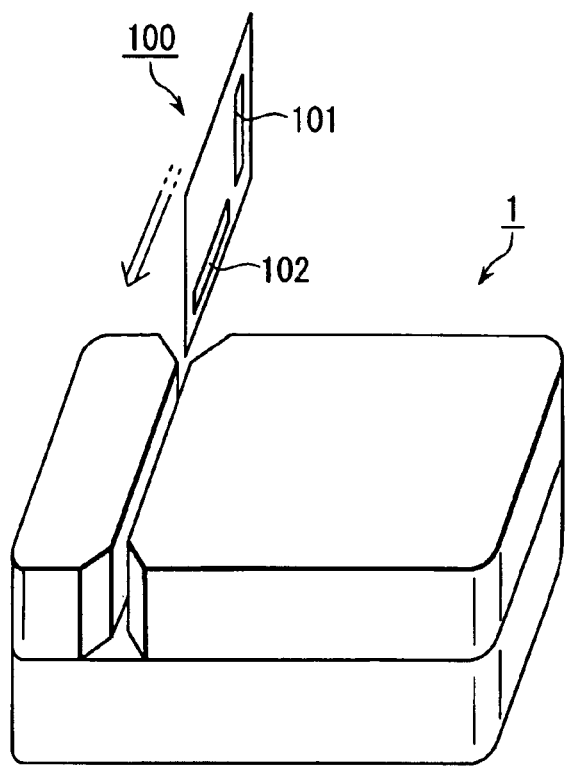
FIGS. 17A and 17B show a reading apparatus which reads information from the recording medium of the invention.
Figure 17B:
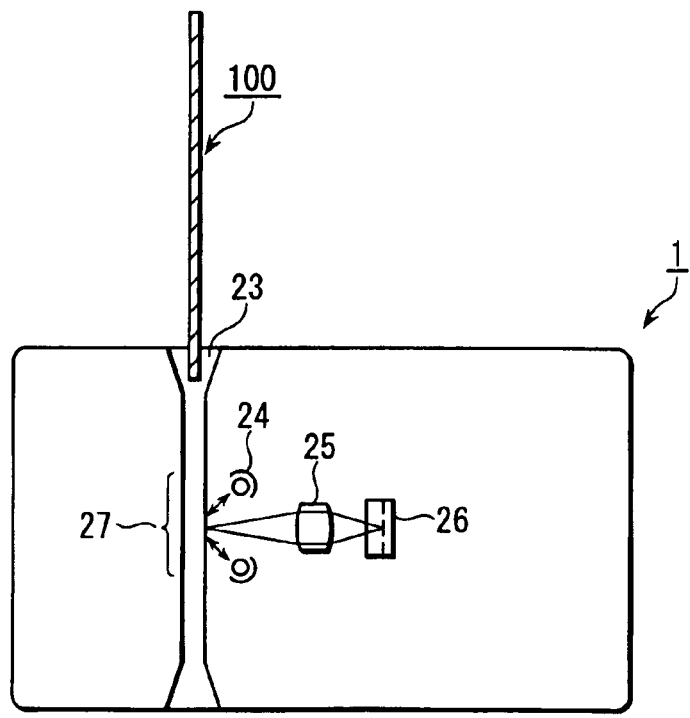

FIGS. 16A and 16B show an example of a dot code to be recorded on a card type recording medium 100 of the invention. FIGS. 17A and 17B show an external appearance of an optical reading apparatus 1 capable of reading information from the card type recording medium 100 and an internal configuration of a pickup section 2 within the apparatus 1, respectively.

One block shown in an enlarged view in FIG. 16A is a unit which constitutes a dot code 1600, and a plurality of coupled blocks is recorded along sides of the card type recording medium 100 as shown in FIG. 16B. More specifically, the dot code 1600 comprises rectangular blocks which are arranged adjacent to each other in a one-dimensional or two-dimensional array.

The general description is given below with regard to a physical format configuration of the dot code 1600 which has been already laid open. The dot code 1600 comprises a plurality of blocks Bn (n≧1) which is arranged adjacent to each other in a one-dimensional or two-dimensional array. Digital data into which multimedia information containing sound, images, text and the like to be recorded is digitized is divided into blocks, each of which is allocated to each predetermined data. A dot image of black dots or white dots corresponding to "ones" or "zeros", respectively, in a bit string subjected to recording modulation for limiting the number of contiguous "ones" of the digital data is recorded (incidentally, the white dot actually corresponds to the color of the card type recording medium 100 in itself).

Furthermore, each block Bn has markers 1601 located at four corners of each block, which are used to set a read reference point which the black or white dots (i.e., data dots) in block user data 1604 are read relative to, and each marker 1601 has a predetermined number of contiguous black dots that do not appear in the block user data 1604. Each block Bn also has pattern codes 1603 which are used to calculate the read reference point with higher accuracy, and block headers 1602 which are used as a block ID to identify each block, and each pattern code 1603 and each block header 1602 are located between the markers 1601.

Areas having no dot are provided around the markers 1601 and the pattern codes 1603 in order to facilitate detecting the markers 1601 and the pattern codes 1603.

With the dot code having the above-described configuration, the size of the whole dot code 1600 can be therefore larger than a visual field of the pickup of the above-mentioned optical reading apparatus 1. In other words, even when an image of the dot code 1600 cannot be picked up with one shot by the optical reading apparatus 1, each address assigned to each block, as well as the data dots included in each block, can be detected block by block from the picked-up image of a part of the dot code 1600, so that a collection of data included in each block can be reconstructed into the original whole data.

Therefore, the card type recording medium 100 can record a large amount of data. Moreover, as shown in FIG. 17A, the card type recording medium 100 has a first coded image (i.e., a dot code along the short side) 101 and a second coded image (i.e., a dot code along the long side) 102 which are printed along the short and long sides of the card type recording medium 100, respectively, and the card type recording medium 100 is formed so that, for example, the second coded image 102 can be read with simplicity and ease through manual scanning in a longitudinal direction along which a plurality of blocks is aligned, as shown by the arrow.

As shown in FIG. 17B, the card type recording medium 100 is manually or automatically moved straight along a slot 23 to function as a guide slot, which is formed by notching a top surface of the optical reading apparatus 1, so as to scan the dot code 102 along the long side of the card type recording medium 100. Thus, the dot code 102 passing through the slot 23 along a slot wall surface 27 near the center of the optical reading apparatus 1 is lit with a set of lighting means (an LED or the like) 24 in the above-mentioned pickup section 2, and then a lens 25 forms an image of the dot code 102 on an image pickup device 26, which then picks up the image.

Since the presence or absence of the card type recording medium 100 in the slot 23 can be detected through detection of a difference in reflectance between the slot wall surface 27 of the slot 23 of the optical reading apparatus 1 and the card type recording medium 100, the amount of light emitted from the LED 24 may be reduced to an amount large enough to detect the presence or absence of the card type recording medium 100, except when the card type recording medium 100 is inserted into the slot 23.

(First Embodiment)

The recording medium of the embodiments of the invention is of the card type, and the above-described coded image is formed on the recording medium. The recording medium has a coded image which contains predetermined record location information indicative of a record location at which the coded image is recorded on the recording medium.

In order to optically read the coded image from the recording medium, the coded image reading apparatus comprises image inputting means for inputting the coded image; and record location determining means for obtaining the record location information from the coded image inputted from the image inputting means, and determining the record location at which the coded image is recorded on the recording medium. Accordingly, the coded image reading apparatus is controlled so that the record location of the coded image can be determined in accordance with the record location information, and therefore the coded image reading apparatus is characterized by being capable of devising various schemes for reading the coded image through the use of the record location information.

Figure 1:
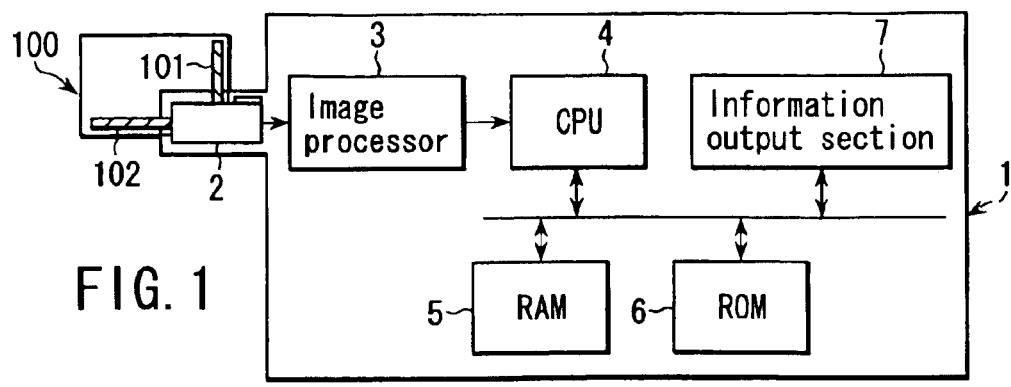
FIG. 1 is a block diagram showing a configuration of a recording medium of the invention and a coded image reading apparatus which reads a dot code (i.e., a coded image) formed on the recording medium.

FIG. 1 shows a block diagram of an electrically functional configuration of a card type recording medium 100 of the first embodiment and an optical reading apparatus (i.e., a coded image reading apparatus 1) which optically reads a dot code (coded image) formed on the card type recording medium 100.

More specifically, the coded image reading apparatus 1 comprises a pickup section 2 which optically picks up a coded image on the card type recording medium 100; an image processing section 3 which subjects the picked-up coded image to predetermined processing to be described later; a CPU 4 which appropriately controls the whole coded image reading apparatus 1; a RAM 5 and a ROM 6 which can be appropriately used as a work area, a program area or a translation table for processing; and an information output section 7 capable of outputting information in a desired form such as a sound or an image in accordance with obtained information or the like.

The pickup section 2 has an optical lens system and a predetermined image pickup device (e.g., a CCD) which are used to read an optically readable coded image on the card type recording medium 100, and means for lighting the coded image (e.g., an LED), which are built in the pickup section 2. A card side along which the coded image is formed on a surface of the card type recording medium 100 is passed through a slot 23 near a slot wall surface 27, and thus the pickup section 2 can optically pick up the coded image formed along the side.

A frame image obtained through image pickup is transferred to the image processing section 3, which then subjects the frame image to equalization for enhancing dots in the frame image and binarization. The binarized frame images are stored in sequence in a predetermined area previously provided as a two-frame buffer in the RAM 5 via the CPU 4. Then, the CPU 4 performs analysis in accordance with the binarized frame images stored in the RAM 5, thereby extracting the coded image (the dot code) in the frame images. Then, block data recorded as the coded image is sequentially decoded in accordance with a block ID recorded in each block header 702, and the decoded data is stored in a predetermined area in the RAM 5.

The CPU 4 is configured to control the apparatus in the following manner: after all of data recorded as the coded image or a predetermined amount of data is stored in the RAM 5, the data stored in the RAM 5 is subjected to decoding such as error correction and expansion, and the decoded data is transferred to the information output section 7, which then outputs the data in the form of images, characters, sounds or the like.

A control program to be executed by the CPU 4 is stored in the ROM 6, which includes a program to read data from the coded image and complement the data fully so as to correctly decode the data, a table, a program to output the decoded data in a predetermined form, and so on.

The operation of picking up the coded image will be described in more detail. More specifically, the pickup section 2 outputs frame images picked up at predetermined intervals. Therefore, a predetermined interval is set to, for example, 30 msec. so that one frame image is input to the image processing section 3 every 30 msec., and thus the image processing section 3 performs equalization and binarization on a frame image within 30 msec. and outputs the binarized image to the CPU 4.

The CPU 4 transfers the binarized image to the RAM 5. The RAM 5 has two areas to store the image, and stores a frame by adopting a mode of buffering the frame by switching back and forth between the two areas, namely, the so-called "ring buffer", and therefore two frames can cyclically undergo image pickup substantially concurrently with image processing in real time.

More specifically, before a lapse of 30 msec. after which a next frame is input to the CPU 4, the CPU 4 extracts the coded image in the binarized frame image which has been already transferred to the buffer, and further extracts block user data of each block from the extracted coded image.

The extracted block user data is written in a predetermined area in the RAM 5. The block user data has respective block IDs, and the block user data is added to the already-stored block user data in consideration of the respective record locations in accordance with the block IDs. A series of image read operations is repeated in the same manner until the end of the operations.

The pickup section 2 picks up the coded image every 30 msec., while lighting the coded image with light like a flash of light emitted from a camera. The CPU 4 writes in the ring buffer each frame image including a plurality of blocks in the coded image which is picked up when the card type recording medium 100 is moving, and then the CPU 4 extracts a series of blocks.

More specifically, the frame buffer is used, and one picked-up frame is configured to be capable of including a plurality of blocks. With this configuration, when the card type recording medium 100 moves through the slot 23 at a predetermined or lower speed, the same blocks are picked up in an overlapping form in a next picked-up frame which follows in time sequence, and therefore all blocks constituting the coded image can be read.

In the case of this example, quite a fast scan operation of the card type recording medium 100 may cause an error in which an image of some blocks cannot be picked up, but scanning at a slower speed than a predetermined speed allows one scan operation to succeed in scanning all blocks. Therefore, the coded image reading apparatus 1 outputs proper instructions to be described later, as well as an error message, so as to give a user advice on how to perform a proper operation for rescan. Following the advice permits picking up an excellent image in an overlapping form without any lack of blocks. Accordingly, the user successfully repeats the operations thereafter, thereby facilitating the correct reading of the blocks of the coded image.

At the occurrence of the error, the time interval, 30 msec., may be, of course, changed to the most adaptable possible interval to a user operation speed so that the error can be handled.

Figures 2A, 2B:
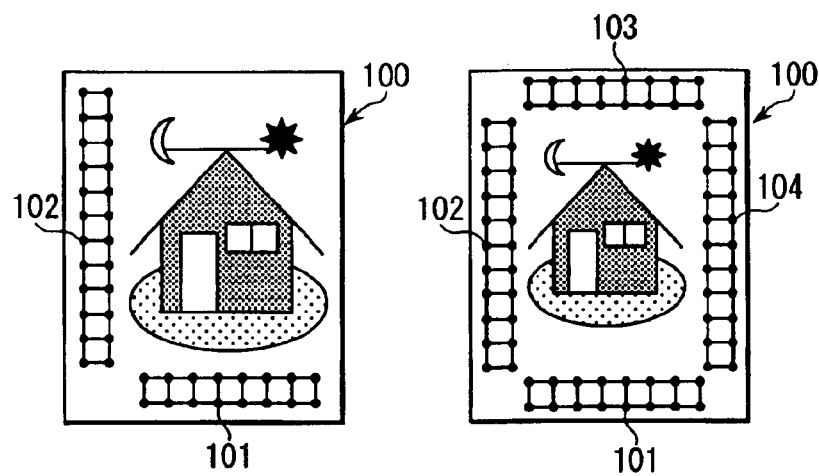
FIGS. 2A and 2B show two examples of the recording medium of the invention.

FIGS. 2A and 2B show two examples of the recording medium of the invention.

The card type recording medium 100 shown as one example in FIG. 2A has a shape such as a rectangle, and has recording areas for the coded images such as the above-mentioned dot codes, along only the respective sides along a length and a width of the card type recording medium 100 (i.e., one long side and one short side). The card type recording medium 100 has a layout in which a relatively short coded image and a relatively long coded image are located near the lower short side and near the left long side, respectively, and a desired readable image (an image of a house in this example) is drawn at the center of the card type recording medium 100.

The card type recording medium 100 shown as the other example in FIG. 2B is a rectangular card in the same manner as the above-mentioned example, and has recording areas along all four sides along the length and the width thereof. The card type recording medium 100 has a layout in which short coded images and long coded images are located near the upper and lower short sides and near the right and left long sides, respectively, and the same readable image is drawn at the center of the card type recording medium 100.

Figure 3:
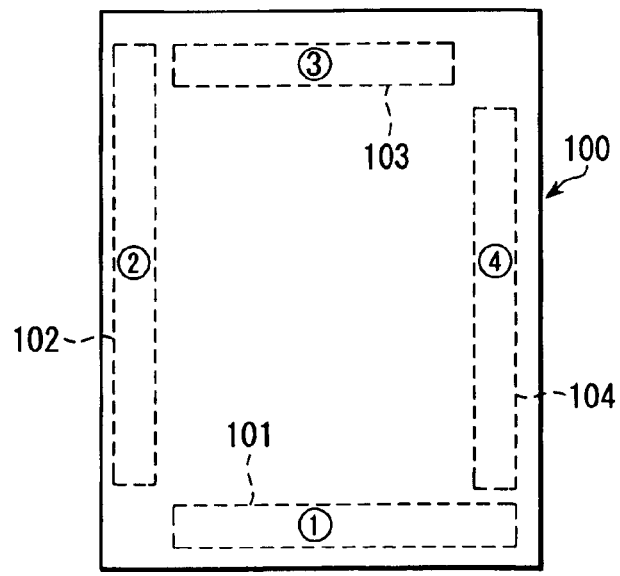
FIG. 3 is a schematic representation illustrating a layout of the coded images on the card shown in FIG. 2B.

The description is given below with reference to FIGS. 3 to 6 with regard to the operation of the card type recording medium 100 (hereinafter referred to as "card 100") of the first embodiment and the coded image reading apparatus 1 which reads the coded image from the card 100. FIG. 3 is an illustration showing a predetermined location in the card 100, that is, a record location at which the coded image is recorded.

The card 100 is a medium on which desired information is recorded as an optically readable coded image. Since the coded image contains record location information indicative of a record location at which the coded image is recorded on a card surface, the card 100 is made to devise various schemes for the reading of the coded image, such as the teaching of an operating method, in accordance with the read record location information.

Each of blocks, which form the coded image on the card 100 of the first embodiment, has unique block ID information as shown in FIG. 13 to be described later, and each block ID information is assigned to each block so that each information can be used as information indicative of a record location unique to each block (record location information).

Figure 4:
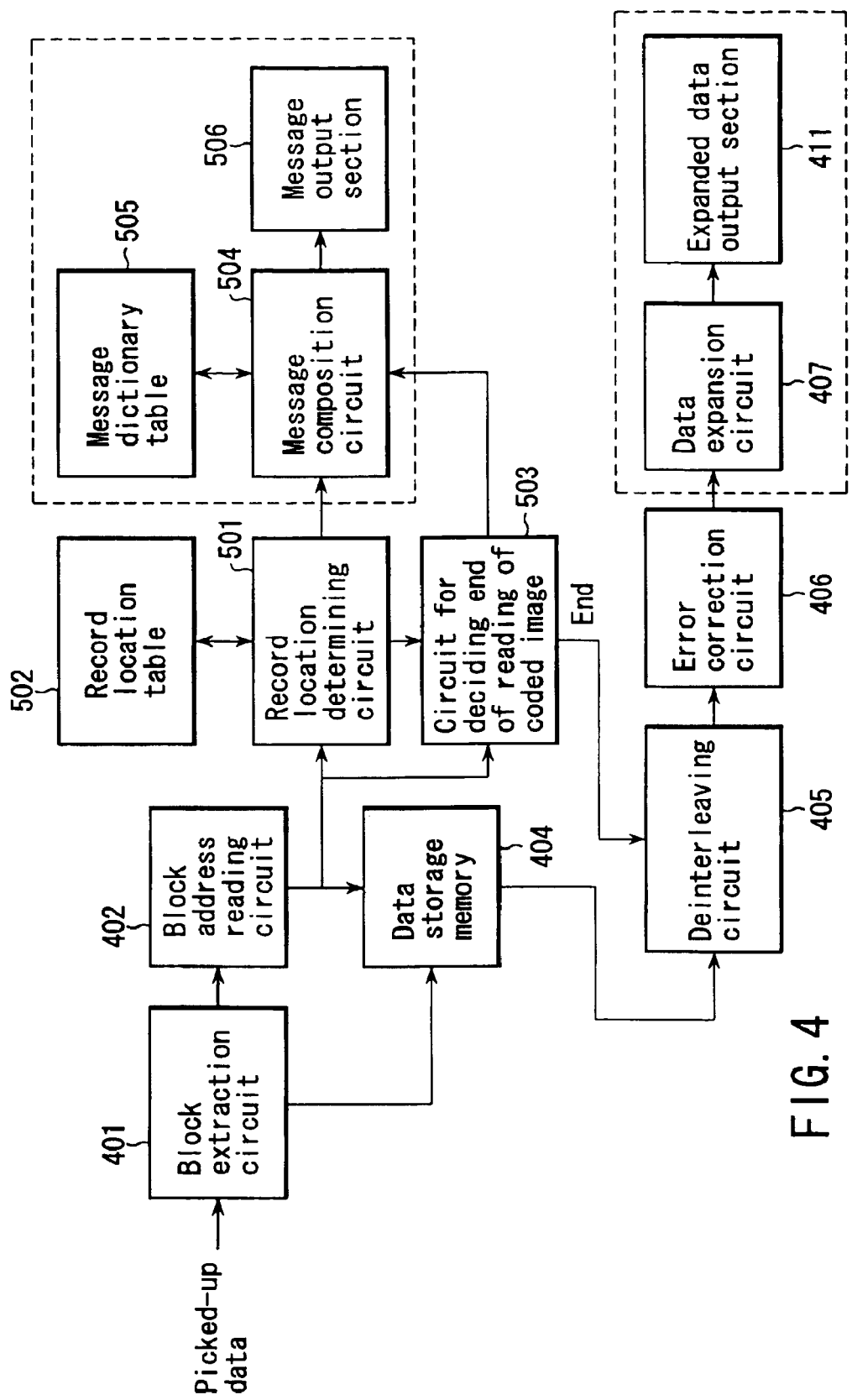
FIG. 4 is a functional block diagram showing the flow of data processing in a coded image reading apparatus of a first embodiment.

The description is given with regard to the process of processing input data using the RAM 5 and the ROM 6 under the control of the above-mentioned CPU 4, with reference to a functional block diagram shown in FIG. 4 in which the arrows indicate flows of data in the coded image reading apparatus 1 of the first embodiment.

First, picked-up data obtained through image pickup is input to a block extraction circuit (401). This is extraction using two buffers, and frame data of binarized images already stored in the buffers is regarded as the picked-up data.

Then, the block extraction circuit (401) transfers information in a block header area to a block address (i.e., "block ID") reading circuit (402).

On the other hand, block user data (i.e., data recorded in the block user data 1604 surrounded by the markers 1601 in FIG. 16A) is read and input into/to a data storage memory (404).

The block address reading circuit (402) extracts block ID information in the block headers 1602. The block ID is a unique address which logically indicates where the block is located, and the block ID is output to the data storage memory (404). The address is used to store the block user data extracted by the preceding block extraction circuit (401) in a predetermined location in the data storage memory (404).

As described above, the block user data is stored in the data storage memory (404) in accordance with the block ID.

Furthermore, the block ID output from the block address reading circuit (402) is input to a record location determining circuit (501) and a circuit (503) for deciding the end of reading of coded image.

In the record location determining circuit (501), where the block is recorded is determined by referring to a record location table (502) recorded in accordance with the block ID.

When the record location determined by the record location determining circuit (501) is, for example, a record location (1), this means that block IDs 1 to n are detected. When the record location is a record location (2), this means that block IDs n+1 to n+m are detected.

Information indicative of the block ID numbers corresponding to the record location (1) or (2) determined by the record location determining circuit (501) is input to the circuit (503) for deciding the end of reading of the coded image.

The block address reading circuit (402) inputs block ID information, which is further read in sequence, to the circuit (503) for deciding the end of reading of the coded image, which then decides whether or not all of blocks corresponding to the record location are obtained. When 95% of blocks, not all blocks, are obtained as an example of criteria for decision, a decision is made that the reading of the coded image "ends", and then, information which gives a command to deinterleave the data stored in the data storage memory (404) is transmitted to a deinterleaving circuit (405) in order to perform deinterleaving (405).

The criteria are set to 95%, because this is the level that can be corrected by the following error correction circuit (406) even when blocks are missing.

The occurrence of time-out may be decided to end the reading of coded image, after a lapse of a predetermined time after the stop of output of block ID information to the circuit (503) for deciding the end of reading of the coded image. A predetermined switch may be manipulated by a user himself/herself after the end of the reading, or a switch signal indicative of "end" may be detected at the instant when the card 100 exits from the slot 23 after the card 100 is scanned by the pickup section 2, and thus, information indicative of "end" can be input to the circuit 503 for deciding the end of reading of the coded image.

The deinterleaving (405) is started in accordance with the end information from the circuit (503) for deciding the end of reading of the coded image, and rearranges the data stored in the data storage memory 404.

Data having an error such as lack of blocks is input to the error correction circuit (406), which then performs error correction on the data. If error correction is impossible, a signal indicative of an uncorrectable error is transmitted to a message composition circuit (504). When error correction is possible, the error-corrected data is subsequently input to a data expansion circuit (407), which then expands the corrected data if the corrected data is subjected to compression or the like. If the corrected data is not subjected to compression or the like, the data expansion circuit (407) lets the data through and transfers the data to an expanded data output section (411).

The data expanded by the data expansion circuit (407) is input to the expanded data output section (411), which then uses a speaker to output and reproduce a sound if the data is the sound, or uses a display to display and output an image if the data is the image.

On the other hand, the record location determining circuit (501) outputs record location information to the message composition circuit (504). The record location information is transferred to the message composition circuit (504) in order to inform the user of information indicative of where the read coded image is recorded.

The circuit (503) for deciding the end of reading of the coded image outputs command information to the message composition circuit (504) in order to control the timing of output of a message composed by the message composition circuit (504).

The message composition circuit (504) determines which message is output, by comparing the table in the ROM and the record location in accordance with the record location input from the record location determining circuit (501). The message composition circuit (504) sends a message to a message output section (506) by referring to a predetermined message in a message dictionary table (505), and thus the information output section 7 shown in FIG. 1 outputs the message.

As described above, the coded image reading apparatus 1 is configured to use the information output section 7 as operation information outputting means for outputting information about user operation in accordance with the record location determined by the above-mentioned means for determining the record location. Therefore, the information about user operation can be output by referring to the record location information. Accordingly, it is possible to appropriately teach a user the operation information required for each record location of the read coded image.

FIG. 5 shows the above-mentioned record location table (502) and message dictionary table (505), which are recorded and held in tabular form.

The block ID Nos. 1 to n correspond to the record location (1) of the code 101 shown in FIG. 3. The block ID Nos. n+1 to n+m correspond to the record location (2) of the code 102. Similarly, messages 1, 2, 3 and 4 corresponding to the record locations (1) to (4) are written in the table so that the messages can be referred to, and the table is set so as to select and output an appropriate message for each of the record locations (1) to (4). In this example, the codes having the same contents, except for block ID information, are recorded at the record locations (1) and (3), and these codes function as backup codes for each other. Similarly, the codes having the same contents, except for block ID information, are recorded at the record locations (2) and (4), and this is the contents of messages.

Selection and switching of the messages 1, 2, 3 and 4 is performed in accordance with an end signal from the circuit (503) for deciding the end of reading of the coded image. In a normal state, the message 1 indicative of normal operation is output. At the occurrence of an error, the instruction message 2, 3 or 4 is selected in accordance with a command signal from the error correction circuit 406. Then, a message composed by the message composition circuit 504 is output.

As described above, the block ID also functions as information indicative of a record location. In the case of the card having the above-described configuration, the record location determining circuit 501 of the coded image reading apparatus 1 can specify the record location by referring to the table showing the correspondence between the record location and each of the block IDs to identify blocks, each of which is an element of the physical format of the coded image shown in FIG. 14A. Therefore, the record location information can be efficiently contained in the physical format without providing an additional element for the record location information only in the physical format. This makes it possible to quickly obtain the record location information.

As shown in FIG. 14B, an element for the record location information only may be provided in the physical format. In this case, the record location can be determined directly rather than by referring to the above-mentioned table showing the correspondence between the record location and each block ID.

Figure 6:
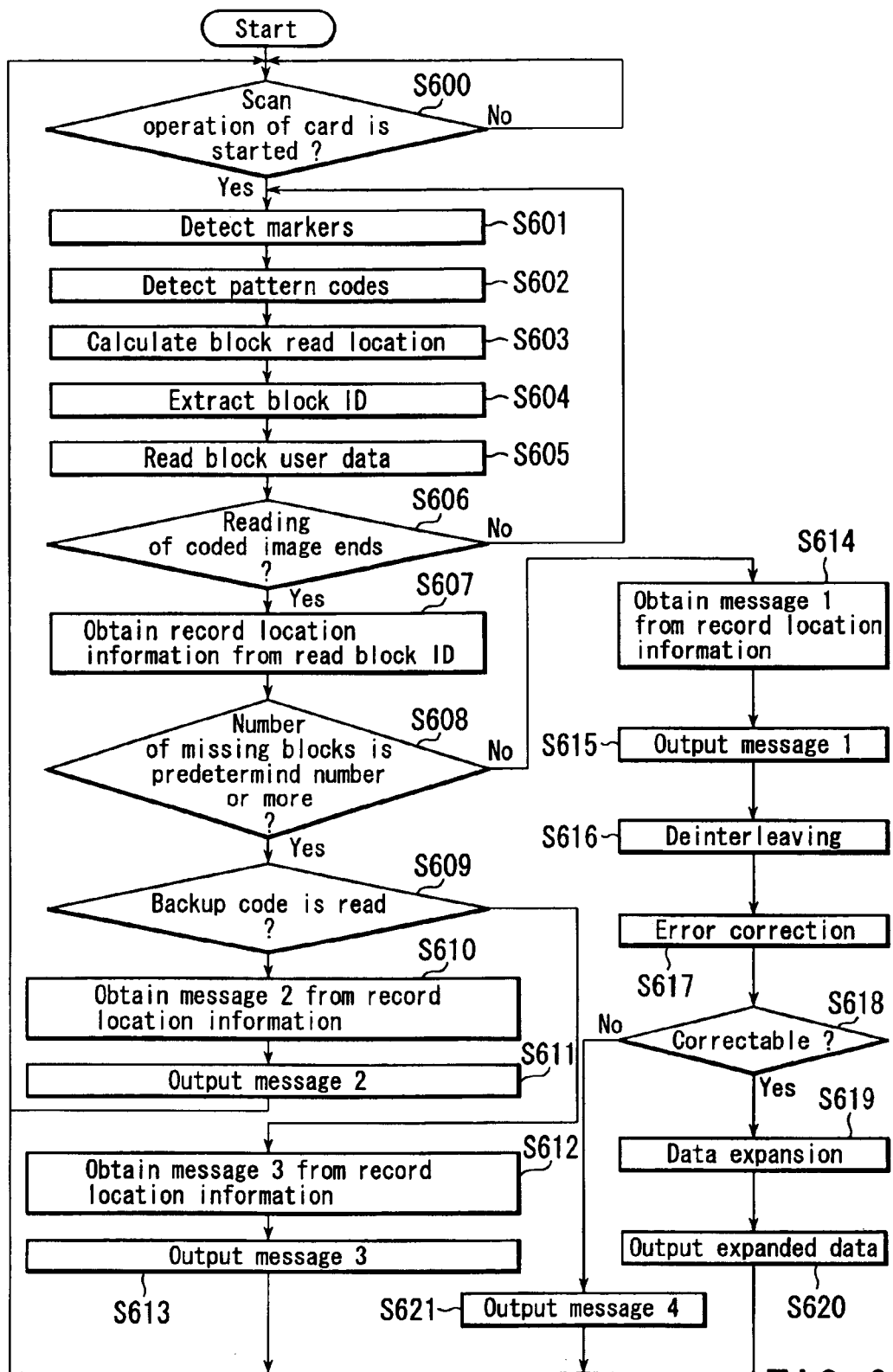
FIG. 6 is a flowchart showing the procedure of operation of the coded image reading apparatus of the first embodiment.

A flowchart shown in FIG. 6 shows the procedure of operation of the coded image reading apparatus of the first embodiment.

In step S600, it is determined whether or not the scan operation of the card is started in a standby state in which the card is inserted (step S600). With the start of the scan operation of the card, the markers are detected to detect the coded image (step S601). After the marker detection, the pattern codes are detected sequentially in areas between the markers so as to read the positions of dots of the pattern codes that determine the precise read location of the block (step S602). The block read location is calculated from the relative positions of the dots of the detected pattern codes (step S603). The block ID is extracted in accordance with the calculated block read location (step S604).

After the extraction of the block ID, the block user data is read in accordance with the block read location (step S605). This is repeated until the reading of the coded image ends for each block (step S606).

When the reading of the coded image ends, the record location information is obtained from the block ID (step S607).

A decision is made as to whether or not the number of missing blocks is a predetermined number or more (step S608). If the number of missing blocks is not the predetermined number or more, the processing goes to step S614.

If the number of missing blocks is the predetermined number or more, a decision is made as to whether or not the backup code is read (step S609). When the first code is read only once, the message 2 is obtained from the record location information (step S610). In the case of, for example, the record location (1) in FIG. 5, the message "The short side code has been read incompletely. Read the code along the short side." is then output (step S611).

After the end of the output of the message, the processing returns to the above-mentioned step S600, and the same steps are repeated until the scan operation of the card is started.

When a user operates the card again, block detection takes place in the same manner so as to obtain the record location from the block ID.

When the number of missing blocks is the predetermined number or more, and when the number of missing blocks is the predetermined number or more even after the backup code is read, the processing goes to step S612, and the message 3 is obtained from the record location information (step S612). Then, the warning message "Too great a deterioration has occurred in the codes along both short sides. Replace the card." is output on the print level (step S613).

After that, the processing returns to the above-mentioned step S600 in the same manner, and reenters a standby state.

On the other hand, when a decision is made that the number of missing blocks is equal to the predetermined number in the above-mentioned step S608, the message 1 is obtained from the record location information (step S614), and the message 1 is output (step S615). After that, deinterleaving is performed on the data in the memory (step S616), and error correction is performed on the data (step S617). Then, whether or not error correction is possible is determined (step S618). When error correction is possible, data expansion is performed on the data (step S619), then the expanded data is output (step S620), and then the processing returns to the above-mentioned step S600 and reenters a standby state.

However, when error correction is impossible, the message 4 is obtained so as to output the message stating that a deterioration in the code cannot be corrected (step S621), and thereafter the processing returns to the above-mentioned step S600 and reenters a standby state.

Various criteria for start are possible in step S600. Various modifications are feasible: for example, whether or not the scan operation starts may be determined according to whether or not a user turns on a start button of the apparatus, or according to a switch which is provided to be automatically turned on when the card 100 is inserted into the end of the slot 23.

Inferences from an exemplary warning stated by the message 3 are not only that deterioration occurs in the formed codes but also that the scan operation is too fast, for example. Which inference is made can be determined by the application of the known technology of velocity detection.

Although the type indicating what card is used-for has not been heretofore held as data, an appropriate message can be output by previously recording detailed data on the type and application of the card 100. Therefore, the card 100 can be practically used in an application to which the card 100 is applied without any errors.

(Second Embodiment)

Next, the description is given with regard to a second embodiment of the invention. In the second embodiment, when a reading apparatus reads coded images on a predetermined plurality of cards, multimedia information recorded in a plurality of cards is first output to the information output section 7. The respective configurations of the card and the coded image reading apparatus are basically the same as those shown in FIG. 1. The main description is given with reference to FIGS. 7 to 9 with regard to different functions and a control procedure using a program.

Figure 7:
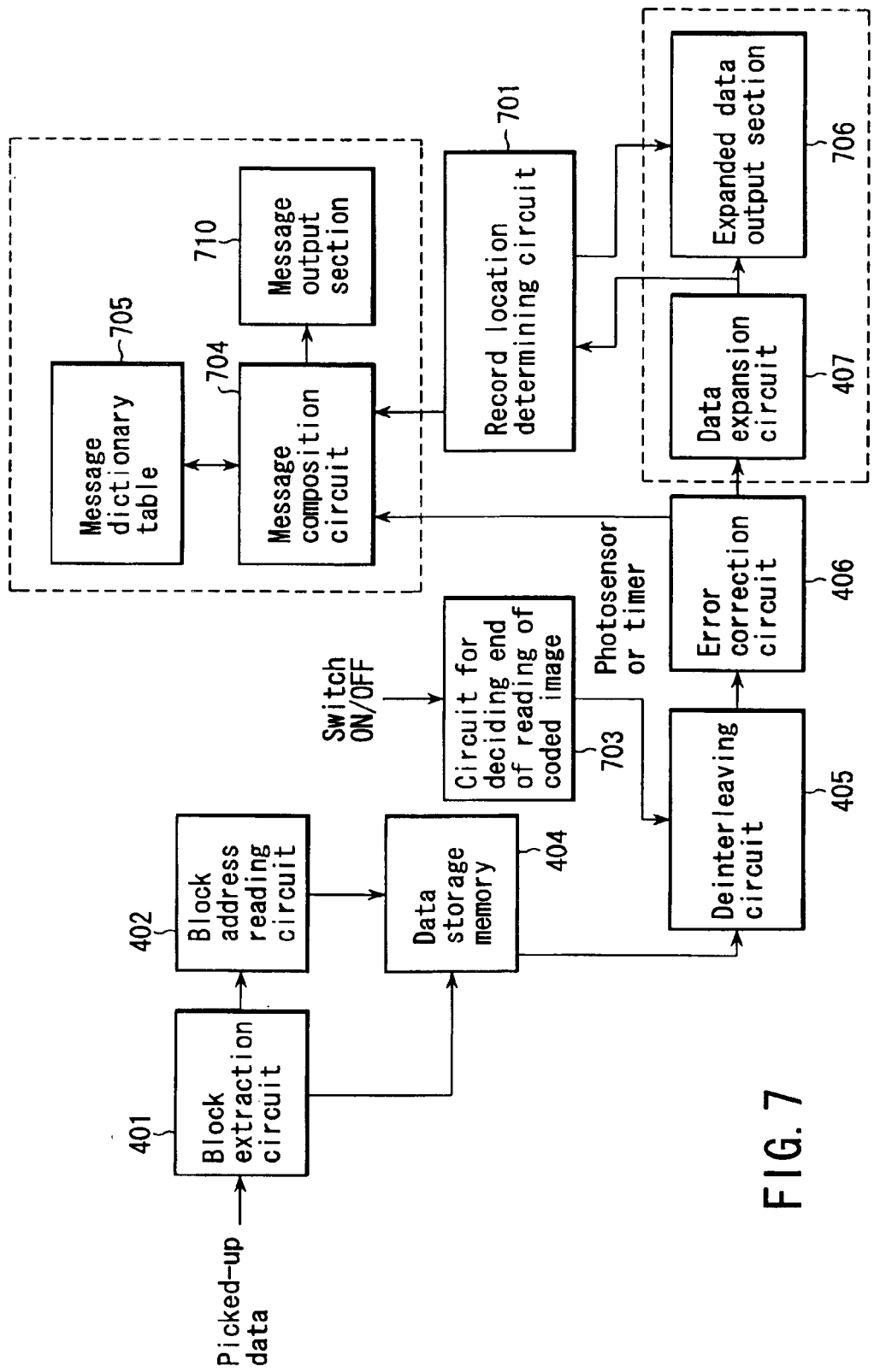
FIG. 7 is a functional block diagram showing the flow of data in a coded image reading apparatus of a second embodiment.

A functional block diagram shown in FIG. 7 shows the flow of data in the coded image reading apparatus of the second embodiment. In the second embodiment, the record location is indicated in a logical format, as distinct from the first embodiment in which the record location information is determined in accordance with the block ID. In the early stages of the processing procedure, the procedure shown in FIG. 7 is assumed to be the same as the procedure shown in FIG. 4 until picked-up data is input to the data storage memory 404.

A circuit 703 for deciding the end of reading of the coded image of the second embodiment decides the end of reading in accordance with an ON/OFF switch signal from a photosensor in the slot or time-out which occurs after a lapse of a predetermined time after the stop of reading of the blocks, although the circuit 503 of the first embodiment decides the end of reading by using the record location information when the number of blocks is a predetermined number or more.

The process of transmitting a signal from the circuit 703 for deciding the end of reading of the coded image to the deinterleaving circuit 405 so as to deinterleave the data in the data storage memory 404 and the process of outputting a message according to whether or not the error correction circuit 406 can perform error correction are the same as the corresponding processes of the first embodiment, and therefore the description of these processes is omitted.

Figure 15:
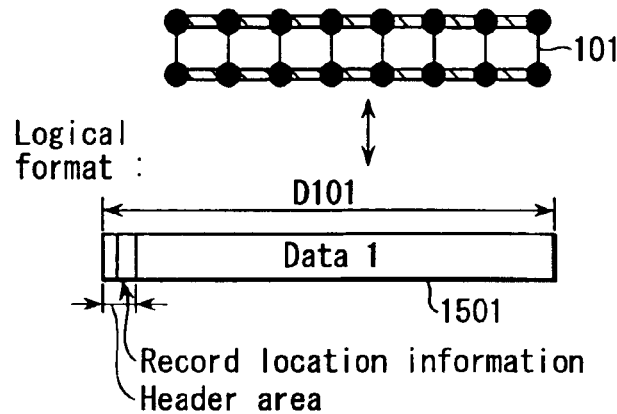
FIG. 15 illustrates a physical format and a logical format of the coded image.

The logical format shown in FIG. 15 is a data structure which appears after the data expansion circuit 407 ends data expansion. The logical format may be written as header information in data or may be held as user data. However, at least "record location information" is stored in the data. Expanded data output from the data expansion circuit 407 is input to a record location determining circuit 701, which then extracts the record location information in the expanded data.

The record location determining circuit 701 transmits information giving a command to start outputting the data to an expanded data output section 706 by using a memory to hold the record location of the read coded image, after the completion of reading of the coded image(s) at one or a plurality of predetermined record location(s). Upon receipt of the command information, the expanded data output section 706 outputs the expanded data to the information output section 7.

Determined information from the record location determining circuit 701 is transmitted to a message composition circuit 704. Then, the message composition circuit 704 outputs a message corresponding to the record location by using a message dictionary table 705 to be described below.

FIG. 8 shows an example of the contents of the message dictionary table 705 in combination with the record locations and the messages.

The record locations (1) to (4) and normal messages 10-1, 10-2 and 10-3 corresponding to the record locations (1) to (4) are written in the table so that they can be referred to.

The message composition circuit 704 selects and edits the corresponding message 10-1, 10-2 or 10-3 from the table in accordance with the command information from the record location determining circuit 701 determined in accordance with the resultant expanded data in consideration of the corresponding record locations (1) to (4), and then a message output section 710 outputs the edited message.

Figure 9:
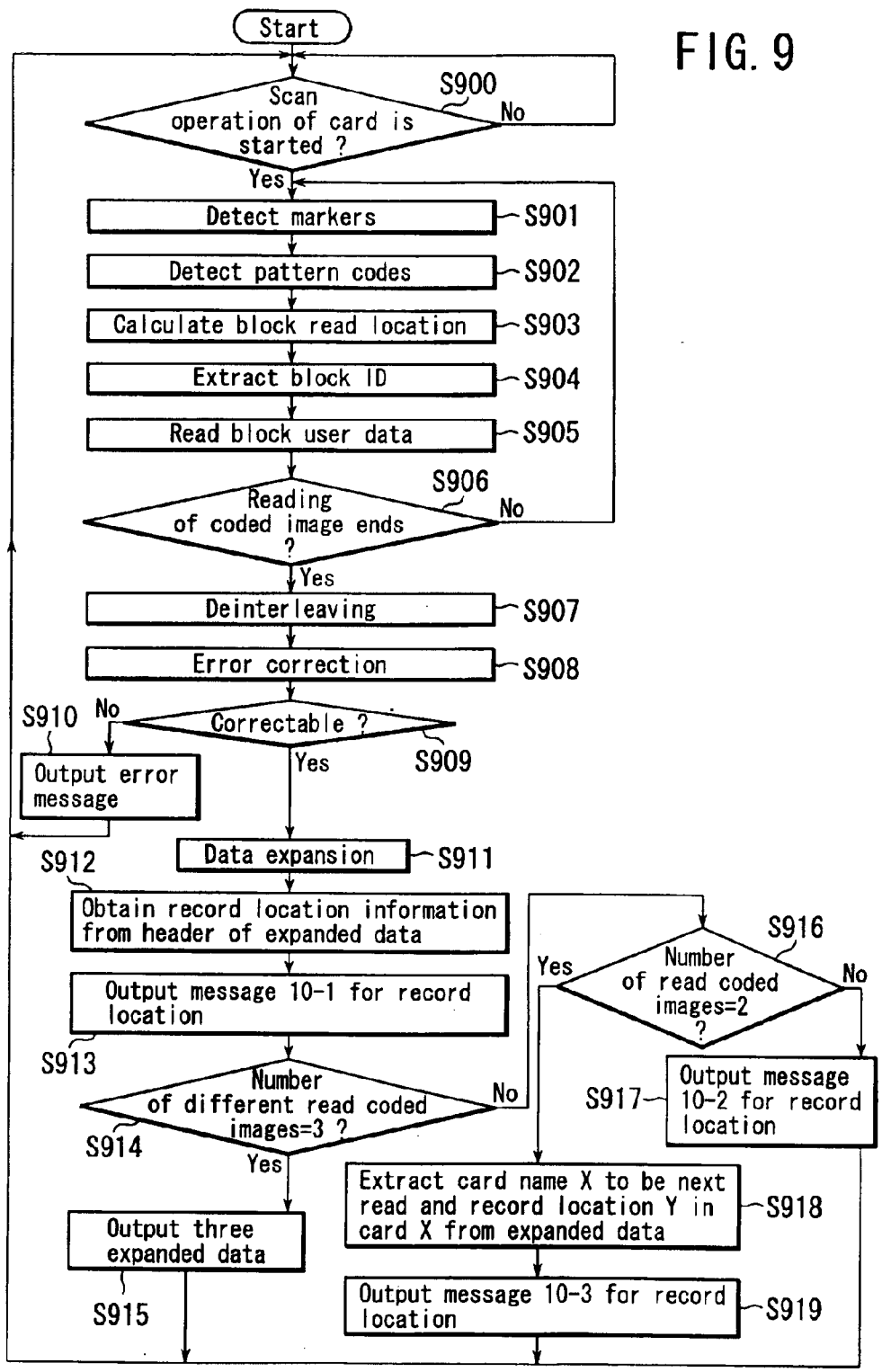
FIG. 9 is a flowchart showing the procedure of operation of the coded image reading apparatus of the second embodiment.

A flowchart shown in FIG. 9 shows the procedure of operation of the coded image reading apparatus of the second embodiment. Incidentally, step S911 of data expansion and the preceding steps of the second embodiment shown in FIG. 9 are the same as the corresponding steps of the first embodiment shown in FIG. 6.

More specifically, in the second embodiment, the coded image is read in the same manner, but the block ID is not used for processing. Therefore, deinterleaving is performed on information in the memory immediately after the end of reading (step S907), and then, error correction is performed on the information (step S908).

After that, whether or not error correction is possible is determined (step S909). When error correction is impossible, the error message is output (step S910), and thus the processing reenters a standby state.

On the other hand, when error correction is possible, data expansion is performed on the data if the data is compressed data (step S911).

Then, record location information is obtained from a header of the expanded data (step S912).

Then, the message 10-1 for the corresponding record location is output (step S913).

The message 10-1 states that "the code along the lower short side has been read", for example when the record location (1) is read.

In the second embodiment, the expanded data is not reproduced until a plurality of coded images is read, and therefore, whether or not the number N of read data items is equal to 3 is determined. In this case, N may be a fixed number previously stored in memory in the apparatus, or may be contained as information in the header of the expanded data.

In step S914, when the number of read data items is not equal to 3, a determination is made as to whether or not the number of read data items is equal to 2, that is, whether or not the next to last data item is read (step S916). If the number of read data items is equal to 3, all three data items are output (step S915). Then, the processing returns to step S900 and enters a standby state for the start of scan operation of another card.

In step S916, if the number of read data items is not equal to 2, that is, if the number of read data items is less than 2, the answer is in the negative, and the processing goes to step S917, where the message 10-2 for the record location is then obtained and output (step S917). After that, the processing returns to the above-mentioned step S900, and the same steps are repeated starting with a standby state for the start of the scan operation of the card.

On the other hand, when the number of read data items is equal to 2 in the above-mentioned step S916 of determining, a card name X to be next read and a record location Y of the coded image on the card X are extracted from the next to last expanded data item. Then, the corresponding message 10-3 is obtained in consideration of the record locations (1) to (4) in accordance with the data X and Y (step S918), and the message 10-3 is output (step S919). In this case, the message 10-3 states "Read the code Y on the card X".

As described above, even when it is necessary to read the codes on a plurality of different cards, the record location information recorded in the coded image permits informing a user of information about the coded image to be next read (which is the information on the record location (1) in the above-mentioned example but may be information indicative of a more abstract group) as the message. Therefore, this can ensure that the coded image is read with higher reliability, and furthermore, this enables the reading procedure in itself to be used for game and educational applications.

(Third Embodiment)

Next, the description is given with regard to a third embodiment of the invention. The third embodiment is based on the precondition that the patterns of occurrences of read errors or the types of recorded data vary according to the record location of the coded image on the card. Similarly to the description of the first and second embodiments, the respective configurations of the card and the reading apparatus are the same as those shown in FIG. 1. Thus, the main description is given with reference to FIGS. 10 to 12 with regard to different functions and a control procedure using a program.

Figure 10:
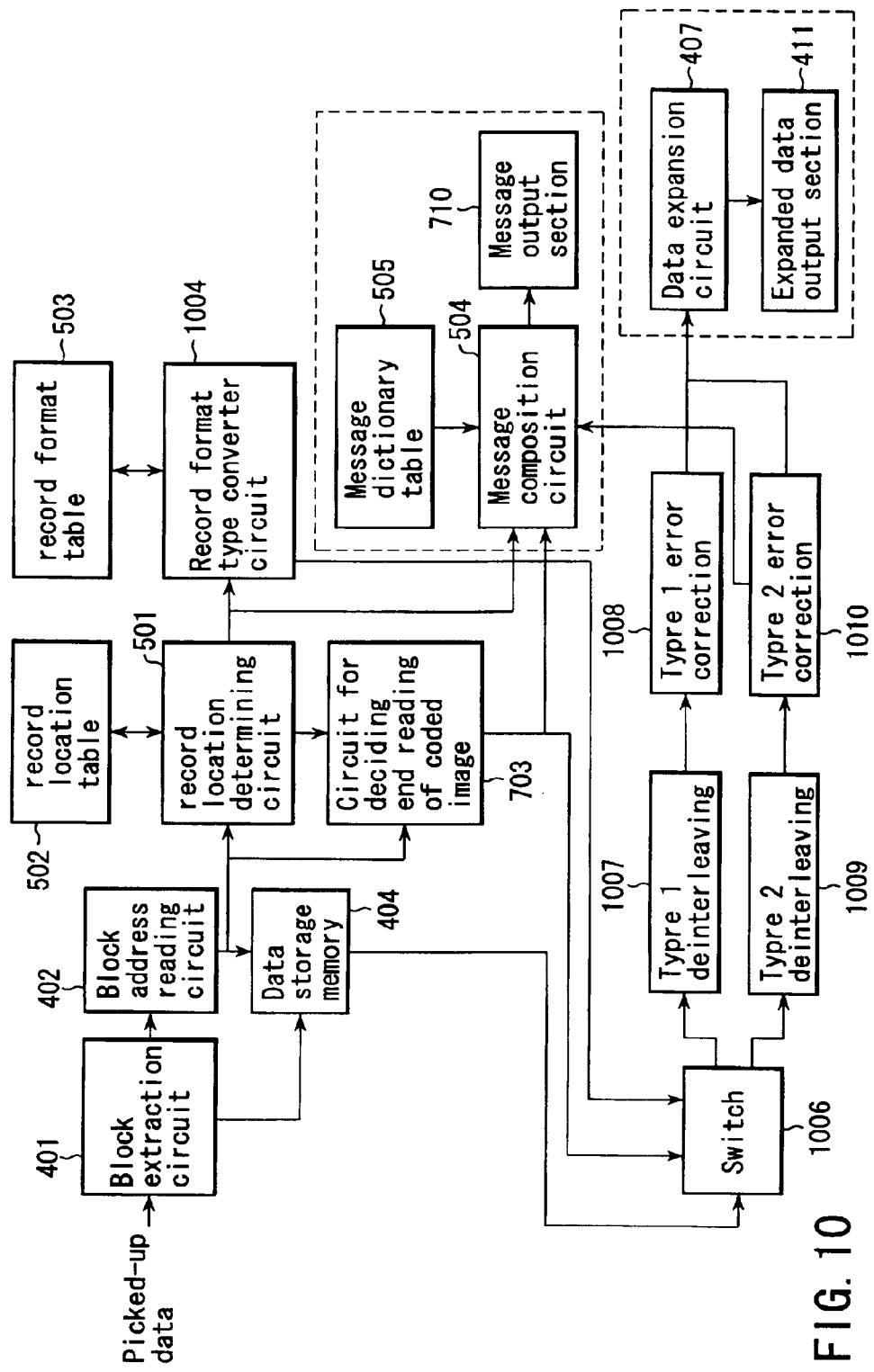
FIG. 10 is a functional block diagram showing the flow of data in a coded image reading apparatus of a third embodiment.

A functional block diagram shown in FIG. 10 shows flows of data in the coded image reading apparatus of the third embodiment. This example is based on the above-mentioned first embodiment in which the block ID is used to determine the record location. More specifically, the block ID obtained by the block address reading circuit 402 is used for the record location determining circuit 501 to determine the record location, and the record location information is used for the circuit 703 for deciding the end of reading of the coded image to decide the end of reading.

In this example, the circuit 703 for deciding the end of reading of the coded image, however, outputs the information indicative of the decision as to the end of reading to a switch 1006, and this switching operation assigns the information to a deinterleaving circuit 1007 or 1009.

On the other hand, the record location information output from the record location determining circuit 501 is input to a record format type converter circuit 1004.

The information indicative of the decision as to the end of reading of coded image, which is input to the switch 1006 to which the information is output, is used to start deinterleaving the data stored in the data storage memory 404.

Furthermore, the record format type converter circuit 1004 inputs to the switch 1006 output format information indicating which type of output format the data to be decoded recorded in the coded image belongs to, in accordance with the result of comparison between the input record location information and data in a record format table 503.

The switch 1006 switches back and forth between type I deinterleaving and type II deinterleaving in accordance with the output format information. Then, type I error correction 1008 takes place after the type I deinterleaving, or type II error correction 1010 takes place after the type II deinterleaving, and thereafter the processing takes place in the same manner as the processing of the above-mentioned embodiments.

When the above-mentioned error correction 1008 or 1010 is impossible, information indicative of an uncorrectable error is input to the message composition circuit 504, and then the message output section 710 outputs a predetermined error message.

FIG. 11 shows the contents of a reference table of the third embodiment. The reference table comprises the block IDs assigned in ascending order, the record locations (1) to (4), the types of data, and the record format types I and II.

The types of data include control data, a program, and material data such as an image or a sound, and the contents of record can be identified according to the types of data.

The record format type, e.g., type I, has the enhanced capability of error correction in order to protect the control data and the program, as compared to data of type II or the like. Moreover, type I is in a logical format having a wider range of interleaving. Furthermore, type I is in a logical format of a type having the further enhanced capability of error correction so as to deal with an increase in read errors caused by the fact that the coded images located along the short sides of the card (i.e., at the record locations (1) and (3)) are scanned with less stability as compared to the coded images located along the long sides thereof (i.e., at the record locations (2) and (4)).

Figure 12:
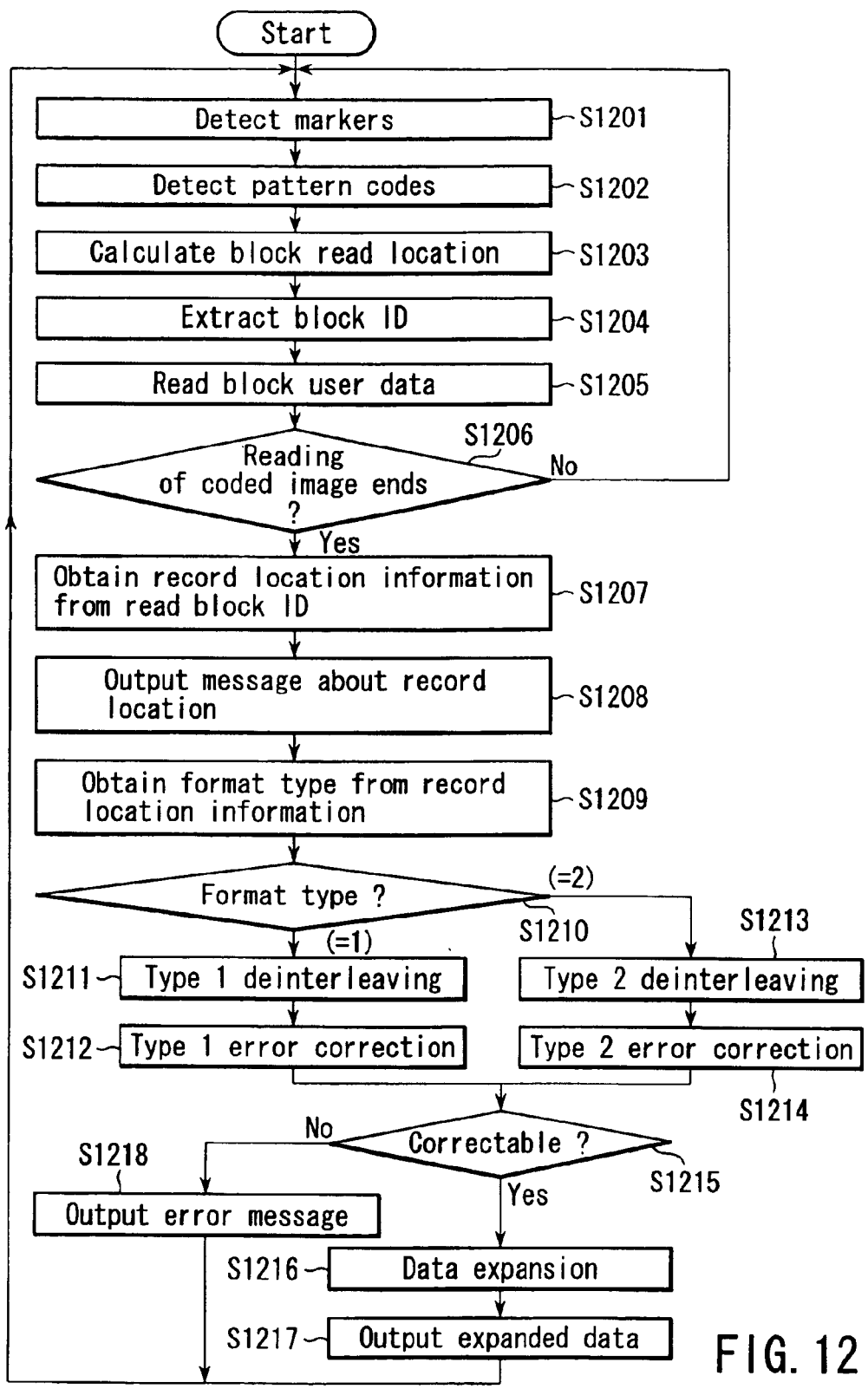
FIG. 12 is a flowchart showing the procedure of operation of the coded image reading apparatus of the third embodiment.

A flowchart shown in FIG. 12 shows the procedure of operation of the coded image reading apparatus 1 of the third embodiment. Incidentally, step S1201 to step S1206 of deciding the end of reading of the coded image of the third embodiment shown in FIG. 12 are the same as the corresponding steps of the first embodiment shown in FIG. 6.

In the third embodiment, after the end of reading of the coded image, record location information is obtained from a read block ID (step S1207), and then a message about the record location is output (step S1208). In this case, the message stating that "The code along the lower short side is read", for example, is output as described by referring to the first embodiment. The format type is obtained from the record location information (step S1209). The processing branches according to whether the format is of "type I" or "type II", and deinterleaving (step S1211 or S1213) and error correction (step S1212 or S1214) take place. Then, whether or not error correction is possible is determined (step S1215). When error correction is impossible, a predetermined error message is obtained and output from the message dictionary table (step S1218).

On the other hand, when error correction is possible, data expansion is performed on the data (step S1216), and then the expanded data is output in a predetermined form to the information output section 7 (step S1217). Then, the processing returns to the first step S1201, and the same steps are repeated starting with a standby state for the start of the scan operation of the card.

As described above, the record location information is determined in accordance with the block ID which is an element of the physical format of the coded image. Thus, the type of data to be recorded in the coded image and the optimum logical format for the type of data can be previously determined in accordance with the record location. Moreover, the record format can be such a logical format as may be adaptable to the patterns of occurrences of errors depending on the record location. Furthermore, switching of the adaptable logical format can be automatically performed in the stage prior to the decoding of the logical format.

FIG. 13 shows the physical formats of the coded images located near four sides of the card type recording medium 100 shown in FIG. 2B.

Four coded images having different contents (i.e., dot codes 101 to 104) are set so that the coded images are recorded along the sides (i.e., the upper, lower, right and left sides). Block IDs, which are called blocks B101(1) to B101(n), blocks B102(n+1) to B102(n+m), blocks B103(n+m+1) to B103(n+m+p) and blocks B104(n+m+p+1) to B104 (n+m+p+q), are assigned to the blocks.

In other words, unique block IDs are assigned to the blocks in order to detect the locations of the coded images laid out in the card as mentioned above.

Formats shown in FIGS. 14A and 14B are the contents of the block header which is an element of the physical format in the coded image. This is an example of the header of the first coded image 101, as the physical format is shown.

A block header 1401 shown in FIG. 14A comprises, for example, header type information, a block ID, and information called correction parity to correct and protect the block ID.

A block header 1402 of another pattern further comprises record location information added between the header type information and the block ID, as shown in FIG. 14B. More specifically, the coded image contains the record location information as an element of the physical format of the coded image. This makes it possible to obtain the record location information in the early stages of the reading process of the coded image.

FIG. 15 shows an example of a logical data format in the coded image. As the physical format is shown, the logical data format of the first coded image 101 comprises a logical header area, record location information provided as a member of the header, and data 1 which is user data following the information. Thus, the header area and the data 1 constitute $D_{101}$.

More specifically, the coded image contains the record location information in the form of header information as an element of the logical data format of the coded image. Therefore, the record location information can be contained in the coded image without any changes in the structure of the physical format.

As described above, the coded image contains the record location information in each block in the form of block ID information as an element of the logical format of the coded image. Therefore, this eliminates the need to provide an additional element for the record location information only in the physical format, so that the record location information can be efficiently contained in the physical format.

The reading apparatus of the invention further includes decoding means for decoding the information in accordance with the record location determined by the record location determining means, and thus the information can be decoded in accordance with the record location. Therefore, the decoding method can be changed according to the record location so as to record a desired coded image.

(Other Modifications)

The above-described embodiments may be modified in the following manner.

Besides the exemplary reading apparatus, an apparatus such as a hand-scanner having a detachable pickup from a body including a CPU, or an apparatus comprising a mechanism for automatically sliding the card may be used. These modifications can be expected to provide the equivalent or exceeding simplicity and ease of operation, as compared to the exemplary reading apparatus.

In the exemplary embodiments, the apparatus is configured to read only a series of blocks, but the apparatus may be improved so as to be capable of reading a plurality of series of blocks simultaneously. This can be realized by appropriately modifying the width of the pickup, a method of reading blocks and a method of determining thereof.

A message may be output in the following form: for example, the message may be output in optional combination with the instructions to retry the scan operation of the card and the cause of an error. The output form may-be modified according to the user who uses the card.

In addition, various changes and modifications may be made in the invention without departing from the spirit and scope thereof.

Although the invention is described above by referring to a plurality of embodiments, the following inventions are incorporated herein.

(1) A recording medium which records information as an optically readable coded image, wherein the coded image contains record location information indicative of a record location at which the coded image is recorded on the recording medium.

In the recording medium of (1), the coded image contains record location information indicative of the record location at which the coded image is recorded on the recording medium. Therefore, this makes it possible to devise various schemes for the reading of the coded image in accordance with the record location information.

(2) The recording medium according to (1), wherein the coded image contains the record location information as an element of a physical format of the coded image.

In the recording medium of (2), the coded image contains the record location information as an element of the physical format of the coded image. Therefore, this makes it possible to obtain the record location information in the early stages of the reading process of the coded image.

(3) The recording medium according to (2), wherein the coded image comprises a plurality of blocks, each of which includes:

an information area containing divided information into which the information is divided;

a marker area including a marker to recognize each of the blocks; and a block ID area containing block ID information to identify each of the blocks, the areas are located in accordance with predetermined relative positions of the areas, and the block ID information also functions as the record location information.

In the recording medium of (3), the coded image contains the record location information in the form of block ID information to identify each block which is an element of the physical format of the coded image. Therefore, this eliminates the need to provide an additional element for the record location information only in the physical format, so that the record location information can be efficiently contained in the physical format.

(4) The recording medium according to (1), wherein the coded image contains the record location information as an element of the logical format of the coded image.

In the recording medium of (4), the coded image contains the record location information as an element of the logical format of the coded image. Therefore, the record location information can be contained in the coded image without any changes in the structure of the physical format.

(5) A coded image reading apparatus for optically reading the coded image from the recording medium according to any one of (1) through (4), including:

image inputting means for inputting the coded image; and record location determining means for obtaining the record location information from the coded image input by the image inputting means, and determining the record location at which the input coded image is recorded on the recording medium.

In the coded image reading apparatus of (5), the coded image contains record location information indicative of a record location at which the coded image is recorded on the recording medium, and the coded image reading apparatus can determine the record location of the coded image in accordance with the record location information. Therefore, the use of the record location information permits devising various schemes for reading the coded image.

(6) The coded image reading apparatus according to (5) further including operation information outputting means for outputting information about user operation in accordance with the record location determined by the record location determining means.

In the coded image reading apparatus of (6), the use of the record location information allows outputting information about user operation. Therefore, necessary operation information can be appropriately output for a user according to the record location of the read coded image.

(7) The coded image reading apparatus according to (6), wherein when a plurality of coded images is recorded on the recording medium, the operation information outputting means outputs information about a record location of a coded image to be next read.

In the coded image reading apparatus of (7), the use of the record location information allows outputting information about a record location of a coded image to be next read. Therefore, this can provide to user with a more interesting and sophisticated way of reading coded images, such as the reading of a plurality of coded images in succession.

(8) The coded image reading apparatus according to (5) further including decoding means for decoding the information in accordance with the record location determined by the record location determining means.

In the coded image reading apparatus of (8), the information can be decoded in accordance with the record location of the coded image. Therefore, the decoding method can be changed according to the record location on the recording medium so as to record the coded image.

(9) The coded image reading apparatus according to (8) further including information type determining means for determining the type of information contained in the coded image recorded at the record location in accordance with the record location determined by the record location determining means, wherein the decoding means decodes the information in accordance with the result of determination by the information type determining means.

In the coded image reading apparatus of (9), the type of information such as a sound or an image contained in the coded image recorded at the record location can be immediately determined in accordance with the record location of the coded image. Therefore, the information can be quickly decoded in accordance with the type of information.

(10) The coded image reading apparatus according to any one of (5) through (9), wherein the coded image comprises a plurality of blocks, each of which includes:

an information area containing divided information into which the information is divided;

a marker area including a marker to allow recognition of each of the blocks; and a block ID area containing block ID information to identify each of the blocks, the areas are located in accordance with predetermined relative positions of the areas, the block ID information also functions as the record location information, and the record location determining means includes a reference table which shows the correspondence between the record location information and the block ID information.

In the coded image reading apparatus of (10), the record location information can be obtained from the reference table which shows the correspondence between the record location information and the block ID information to identify each block which is an element of the physical format of the coded image. Therefore, this eliminates the need to provide an additional element for the record location information only in the physical format, so that the record location information can be efficiently contained in the physical format. As a result, the record location information can be quickly obtained.

(Advantages of the Invention)

As described above, the invention can provide a recording medium and a coded image reading apparatus which make it possible to devise various schemes for the reading of an optically readable coded image in accordance with the record location at which the coded image is recorded on the recording medium, and which enable a user to make simple and proper use of the recording medium and the apparatus.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A card medium which records information as an optically readable coded image, wherein said coded image contains: (i) record location information indicative of a record location at which said coded image is recorded on said card medium, and (ii) information regarding a name of an additional card medium which records an additional coded image to be subsequently read by a user.

2. The card medium according to claim 1, wherein said record location information comprises an element of a physical format of said coded image.

3. The card medium according to claim 2, wherein said coded image comprises a plurality of blocks, each of which includes:

an information area containing divided information into which said information is divided;

a marker area including a marker to allow recognition of each of said blocks; and a block ID area containing block ID information to identify each of said blocks, wherein said areas are located in accordance with predetermined relative positions of said areas, and wherein said block ID information also functions as said record location information.

4. The card medium according to claim 1, wherein said record location information comprises an element of a logical format of said coded image.

5. The card medium according to claim 1, wherein the coded image further includes additional record location information indicative of a record location on the additional card medium, at which the additional coded image to be subsequently read by the user is recorded.

6. A coded image reading apparatus for optically reading a coded image from a card medium which records information as an optically readable coded image, wherein the coded image contains: (i) record location information indicative of a record location at which the coded image is recorded on said card medium, and (ii) information regarding a name of an additional card medium which records an additional coded image to be subsequently read by a user;

said apparatus including:
image inputting means for inputting the coded image;
record location information obtaining means for obtaining the record location information from the coded image input by said image inputting means;
medium information obtaining means for obtaining the information regarding the name of the additional card medium from the coded image input by said image inputting means, based on the record location information obtained by the record location information obtaining means; and
outputting means for outputting for the user the information regarding the name of the additional card medium.

7. The coded image reading apparatus according to claim 6, wherein the coded image comprises a plurality of blocks, each of which includes:

an information area containing divided information into which the information is divided;

a marker area including a marker to allow recognition of each of the blocks; and a block ID area containing block ID information to identify each of the blocks, wherein the areas are located in accordance with predetermined relative positions of the areas, wherein the block ID information also functions as the record location information, and wherein said record location information obtaining means includes a reference table which shows a correspondence between the record location information and the block ID information.

8. The coded image reading apparatus according to claim 6, wherein:

the coded image further includes additional record location information indicative of a record location on the additional card medium, at which the additional coded image to be subsequently read by the user is recorded;

the medium information obtaining means obtains the information regarding the name of the additional card medium and the additional record location information indicative of the record location on the additional card medium, from the coded image input by the image inputting means, based on the record location information obtained by the record location information obtaining means; and the outputting means outputs for the user the information regarding the name of the additional card medium and the record location information indicative of the record location on the additional card medium.

* * * * *